United States Patent
Lewis (10) Patent No.: US 11,327,811 B2
(45) Date of Patent: May 10, 2022

(54) DISTRIBUTED COMPUTING MESH

(71) Applicant: CenturyLink Intellectual Property LLC, Denver, CO (US)

(72) Inventor: Ronald A. Lewis, Monroe, LA (US)

(73) Assignee: CenturyLink Intellectual Property LLC, Broomfield, CO (US)

( * ) Notice: Subject to any disclaimer, the term of this patent is extended or adjusted under 35 U.S.C. 154(b) by 597 days.

(21) Appl. No.: 15/849,924

(22) Filed: Dec. 21, 2017

(65) Prior Publication Data

US 2019/0012212 A1     Jan. 10, 2019

Related U.S. Application Data

(60) Provisional application No. 62/529,336, filed on Jul. 6, 2017.

(51) Int. Cl.
| | |
|---|---|
| *G06F 9/50* | (2006.01) |
| *H04L 67/1004* | (2022.01) |
| *H04L 67/10* | (2022.01) |
| *H04L 67/52* | (2022.01) |
| *H04W 4/02* | (2018.01) |

(52) U.S. Cl.
CPC ............ *G06F 9/5083* (2013.01); *G06F 9/505* (2013.01); *G06F 9/5044* (2013.01); *G06F 9/5072* (2013.01); *H04L 67/1004* (2013.01); *H04L 67/10* (2013.01); *H04L 67/18* (2013.01); *H04W 4/023* (2013.01)

(58) Field of Classification Search
CPC ...... G06F 9/5083; G06F 9/5044; G06F 9/505; G06F 9/5072; G06F 9/5011; H04L 67/10

USPC .......................................... 709/202, 203, 223
See application file for complete search history.

(56) References Cited

U.S. PATENT DOCUMENTS

| | | | |
|---|---|---|---|
| 2007/0124363 A1* | 5/2007 | Lurie | H04L 41/00 709/202 |
| 2011/0289134 A1* | 11/2011 | de los Reyes | H04L 63/205 709/203 |
| 2013/0028091 A1* | 1/2013 | Sun | G06F 9/5083 370/236 |
| 2015/0135185 A1* | 5/2015 | Sirota | G06F 9/5011 718/103 |
| 2016/0072917 A1* | 3/2016 | Huang | H04L 67/10 |
| 2017/0300363 A1* | 10/2017 | Liu | G06F 9/5083 |
| 2018/0349465 A1* | 12/2018 | Eda | G06F 9/5044 |

* cited by examiner

*Primary Examiner* — Joshua D Taylor (57) ABSTRACT

Novel tools and techniques are provided for implementing a distributed computing mesh, and, more particularly, for implementing a distributed computing mesh using a hierarchical framework to distribute workload across multiple computing nodes. In various embodiments, a hierarchical distributed computing mesh might be implemented using a plurality of network nodes. A first control node may assign at least one first network node as at least one second control node. The second control node might receive a computing task from the first control node. The second control node might designate additional network nodes to process one or more portions of the computing task. The second control node may then divide the computing task and send the one or more portions of the computing task to the additional network nodes for processing. The second control node may receive one or more processed portions of the computing task from the additional network nodes.

12 Claims, 6 Drawing Sheets

DISTRIBUTED COMPUTING MESH

CROSS-REFERENCES TO RELATED APPLICATIONS

This application claims priority to U.S. Patent Application Ser. No. 62/529,336 (the "336 Application"), filed Jul. 6, 2017 by Ronald A. Lewis, entitled, "Distributed Computing Mesh Using Smart Residential Gateways," the disclosure of which is incorporated herein by reference in its entirety for all purposes.

COPYRIGHT STATEMENT

A portion of the disclosure of this patent document contains material that is subject to copyright protection. The copyright owner has no objection to the facsimile reproduction by anyone of the patent document or the patent disclosure as it appears in the Patent and Trademark Office patent file or records, but otherwise reserves all copyright rights whatsoever.

FIELD

The present disclosure relates, in general, to methods, systems, and apparatuses for implementing a distributed computing mesh, and, more particularly, to methods, systems, and apparatuses for implementing a distributed computing mesh using a hierarchical framework to distribute workload across multiple computing nodes or multiple layers of computing nodes.

BACKGROUND

Traditionally, in distributed computing systems, a computational problem may be divided into multiple computing tasks for computing resources to solve in parallel. Each computer resource processing a computing task is identical in nature running on a flat network. Each computer resource that receives a computing task operates independently of the other computing resources and would not designate additional computing resources to process a computing task. Additionally, computing resources are centralized in a cloud-based infrastructure (e.g., server farms, data centers, and/or the like). This centralized cloud-based infrastructure has limited computation and dynamic storage (e.g., memory) due to power constraints and risks of overheating.

Hence, there is a need for more robust and scalable solutions for implementing a distributed computing mesh, and, more particularly, to methods, systems, and apparatuses for implementing a distributed computing mesh using a hierarchical framework to distribute workload across multiple computing nodes or multiple layers of computing nodes.

BRIEF DESCRIPTION OF THE DRAWINGS

A further understanding of the nature and advantages of particular embodiments may be realized by reference to the remaining portions of the specification and the drawings, in which like reference numerals are used to refer to similar components. In some instances, a sub-label is associated with a reference numeral to denote one of multiple similar components. When reference is made to a reference numeral without specification to an existing sub-label, it is intended to refer to all such multiple similar components.

DETAILED DESCRIPTION OF CERTAIN EMBODIMENTS

Overview

Various embodiments provide tools and techniques for implementing a distributed computing mesh, and, more particularly, methods, systems, and apparatuses for implementing a distributed computing mesh using a hierarchical framework to distribute workload across multiple computing nodes or multiple layers of computing nodes.

In various embodiments, a hierarchical distributed computing mesh might be implemented using a plurality of network nodes. In order to create a hierarchical distributed mesh, a first control node may assign at least one first network node as at least one second control node. The at least one second control node might receive a computing task from the first control node. The computing task may be a portion of a computational problem. The at least one second control node might determine an amount of computing power necessary to process the computing task and might designate one or more additional network nodes to process one or more portions of the computing task. Further, the at least one second control node may send the one or more portions of the computing task to the one or more additional network nodes for processing. Additionally and/or alternatively, the at least one second control node may receive one or more processed portions of the computing task from the one or more additional network nodes.

At least one of the first control node, the second control node, the network node(s), and/or the additional network nodes may be distributed throughout at least one of a local area network, a service provider network, a combination of a local area network and a service provider network, and/or the like. The control nodes and/or network nodes do not have to be centralized in a data center, server farm, or the like. By decentralizing the control nodes and/or network nodes, the costs of distributed computing may be shifted from control nodes and/or network nodes located at data centers, server farms, or the like to control nodes and/or network nodes located at customer premises. This reduces the costs of data center(s), server farm(s), or the like because the procurement, maintenance, and sustainment of the network nodes are at least partially transferred to consumer equipment at customer premises. Further, the hierarchical distributed computing mesh minimizes the HVAC cost and environmental costs of data centers, server farms, or the like because only some of the control nodes and/or network nodes may reside in the data center, server farm, or the like while other control nodes and/or network nodes reside at customer premises. And in some cases, all of the control nodes and/or network nodes may be located at the customer premises.

The following detailed description illustrates a few exemplary embodiments in further detail to enable one of skill in the art to practice such embodiments. The described examples are provided for illustrative purposes and are not intended to limit the scope of the invention.

In the following description, for the purposes of explanation, numerous specific details are set forth in order to provide a thorough understanding of the described embodiments. It will be apparent to one skilled in the art, however, that other embodiments of the present invention may be practiced without some of these specific details. In other instances, certain structures and devices are shown in block diagram form. Several embodiments are described herein, and while various features are ascribed to different embodiments, it should be appreciated that the features described with respect to one embodiment may be incorporated with other embodiments as well. By the same token, however, no single feature or features of any described embodiment should be considered essential to every embodiment of the invention, as other embodiments of the invention may omit such features.

Unless otherwise indicated, all numbers used herein to express quantities, dimensions, and so forth used should be understood as being modified in all instances by the term "about." In this application, the use of the singular includes the plural unless specifically stated otherwise, and use of the terms "and" and "or" means "and/or" unless otherwise indicated. Moreover, the use of the term "including," as well as other forms, such as "includes" and "included," should be considered non-exclusive. Also, terms such as "element" or "component" encompass both elements and components comprising one unit and elements and components that comprise more than one unit, unless specifically stated otherwise.

Various embodiments described herein, while embodying (in some cases) software products, computer-performed methods, and/or computer systems, represent tangible, concrete improvements to existing technological areas, including, without limitation, distributed computing, and/or the like. In other aspects, certain embodiments, can improve the functioning of user equipment or systems themselves, for example, by distributing processing power among different user equipment or systems. In particular, to the extent any abstract concepts are present in the various embodiments, those concepts can be implemented as described herein by devices, software, systems, and methods that involve specific novel functionality (e.g., steps or operations), such as, by distributing processing power among different user equipment or systems across a hierarchy of computing nodes or of layers of computing nodes. These operations extend beyond mere conventional computer processing operations. These functionalities can produce tangible results outside of the implementing computer system, including, merely by way of example, completing computational problems using a hierarchical computing mesh effectively and efficiently; shifting processing power from data centers, server farms, and/or the like to customer premises; reducing data center, server farm and/or the like space, power, and HVAC use; and/or the like.

In an aspect, a method might comprise assigning, with a first control node, at least one first network node as at least one second control node and receiving, with the at least one second control node, a computing task from the first control node. The computing task may be a portion of a computational problem. The method might also comprise determining, with the at least one second control node, an amount of computing power necessary to process the computing task; designating, with the at least one second control node, one or more additional network nodes to process one or more portions of the computing task, based at least in part on the determined amount of computing power; and sending, with the at least one second control node, the one or more portions of the computing task to the one or more additional network nodes for processing. The method might further comprise receiving, with the at least one second control node and from the one or more additional network nodes, one or more processed portions of the computing task.

In some embodiments, the method might additionally include combining, with the at least one second control node, the one or more processed portions of the computing task to form a completed computing task and sending, with the at least one second control node, the completed computing task to the first control node.

In additional embodiments, the first control node may be a master control node that receives a computational problem and divides the computational problem into one or more computing tasks to send to one or more second control nodes. The method might further comprise assigning, with the master control node, at least two first network nodes to be at least two second control nodes; combining, with each of the at least two second control nodes, the one or more portions of the computing task to form a completed computing task; and sending, with each of the at least two second control node, the completed computing tasks to the master control node. Additionally, the method might include combining, with the master control node, the completed computing tasks that are received from the at least two second control nodes, to form a completed computational problem.

In various embodiments, the first control node may be another intermediary control node that receives a computational task and divides the computational task into one or more portions to send to one or more network nodes or one or more additional intermediary control nodes. Additionally and/or alternatively, the at least one second control node may assign the one or more additional network nodes to be one or more additional intermediary control nodes.

Merely by way of example, in some embodiments, the at least one of the first control node or the at least one second control node may be one of a residential gateway, a business gateway, a virtual gateway, and/or the like. The method may also include determining, with one of the residential gateway, the business gateway, or the virtual gateway, an amount of processing power available in a local area network; and based on a determination that the amount of processing power available in the local area network is insufficient to complete the computing task, designating, with one of the residential gateway, the business gateway, or the virtual gateway, at least one of one or more additional control nodes or one or more supplemental network nodes located in the service provider network to complete the computing task.

In some embodiments, the one or more additional network nodes may be at least one of residential gateways, business gateways, virtual gateways, and/or the like. Additionally and/or alternatively, the one or more additional network nodes may be consumer grade equipment, which might include at least one of a desktop computer, a tablet computer, a laptop computer, a handheld computer, an Internet-enabled mobile telephone, a personal digital assistant, a smart watch, a video game console, and/or the like. Additionally and/or alternatively, the one or more additional network nodes may be the same consumer grade equipment and/or two different types of consumer grade equipment.

According to some embodiments, the at least one second control node may designate the one or more additional network nodes to process one or more portions of the computing task based at least in part on proximity of the one or more additional network nodes to the at least one second control node. The proximity of the one or more additional network nodes may be determined based at least in part on at least one of logical proximity of the one or more additional network nodes to the at least one second control node or physical proximity of the one or more additional network nodes to the at least one second control node.

In yet another embodiment, the method might further include receiving, with the at least one second control node and from the one or more additional network nodes, information associated with the one or more additional network nodes, wherein the information includes information regarding processing power of the one or more additional network nodes; and determining, with the at least one second control node and based on the information received from the one or more additional network nodes, a number of the one or more additional network nodes necessary to complete the computing task.

In another aspect, an apparatus might comprise a first network node. The first network node may be assigned as an intermediary control node by a first control node. The intermediary control node may include at least one processor and a non-transitory computer readable medium communicatively coupled to the at least one processor. The non-transitory computer readable medium might have stored thereon computer software comprising a set of instructions that, when executed by the at least one processor, causes the intermediary control node to: receive a computing task (e.g., a portion of a computational problem) from the first control node; determine an amount of computing power necessary to process the computing task; designate one or more additional network nodes to process one or more portions of the computing task, based at least in part on the determined amount of computing power; send the one or more portions of the computing task to the one or more additional network nodes for processing; and receive, from the one or more additional network nodes, one or more processed portions of the computing task.

In some embodiments, the set of instructions, when executed by the at least one processor, may further cause the intermediary control node to: combine the one or more processed portions of the computing task to form a completed computing task; and send the completed computing task to the first control node.

Additionally and/or alternatively, the set of instructions, when executed by the at least one processor, may further cause the intermediary control node to: assign at least one network node of the one or more additional network nodes to be an additional control node.

In yet another aspect, a system might comprise at least one first network node and one or more additional network nodes. The at least one first network node may be assigned as an intermediary control node by a first control node. Each intermediary control node might comprise at least one first processor and a first non-transitory computer readable medium communicatively coupled to the at least one first processor. The first non-transitory computer readable medium might have stored thereon computer software comprising a first set of instructions that, when executed by the at least one first processor, causes each intermediary control node to: receive a computing task (e.g., a portion of a computational problem) from the first control node; determine an amount of computing power necessary to process the computing task; designate one or more additional network nodes to process one or more portions of the computing task, based at least in part on the determined amount of computing power; send the one or more portions of the computing task to the one or more additional network nodes for processing; receive, from the one or more additional network nodes, one or more processed portions of the computing task; and combine the one or more processed portions of the computing task to form a processed computing task.

The one or more additional network nodes might each comprise at least one second processor and a second non-transitory computer readable medium communicatively coupled to the at least one second processor. The second non-transitory computer readable medium might have stored thereon computer software comprising a second set of instructions that, when executed by the at least one second processor, causes the additional network node to: receive, from the at least one intermediary control node, one or more portions of the computing task; process the one or more portions of the computing task; and send the one or more processed portions of the computing task to the at least one intermediary control node.

In some embodiments, the system may further comprise a first control node. The first control node might comprise at least one third processor and a third non-transitory computer readable medium communicatively coupled to the at least one third processor. The third non-transitory computer readable medium might have stored thereon computer software comprising a third set of instructions that, when executed by the at least one third processor, causes the first control node to: assign the at least one first network node as the at least one intermediary control node; send the computing task (e.g., a portion of the computational problem) to the at least one intermediary control node; receive the processed computing task from the at least one intermediary control node; and combine the processed computing task from the at least one intermediary control node with additional processed computing tasks to form a completed computing task and/or a completed computational problem.

In additional embodiments, the system may have at least two intermediary control nodes. Each intermediary control node may designate the one or more additional network nodes to process one or more portions of the computing task based at least in part on proximity of the one or more additional network nodes to the intermediary control node. Each intermediary control node may designate different network nodes.

Various modifications and additions can be made to the embodiments discussed without departing from the scope of the invention. For example, while the embodiments described above refer to particular features, the scope of this invention also includes embodiments having different combination of features and embodiments that do not include all of the above described features.

Specific Exemplary Embodiments

We now turn to the embodiments as illustrated by the drawings. FIGS. 1-6 illustrate some of the features of the method, system, and apparatus for implementing a distributed computing mesh, and, more particularly, for implementing a distributed computing mesh using a hierarchical framework to distribute workload across multiple computing nodes or across multiple layers of computing nodes. The methods, systems, and apparatuses illustrated by FIGS. 1-6 refer to examples of different embodiments that include various components and steps, which can be considered alternatives or which can be used in conjunction with one another in the various embodiments. The description of the illustrated methods, systems, and apparatuses shown in FIGS. 1-6 is provided for purposes of illustration and should not be considered to limit the scope of the different embodiments.

Figure 1:
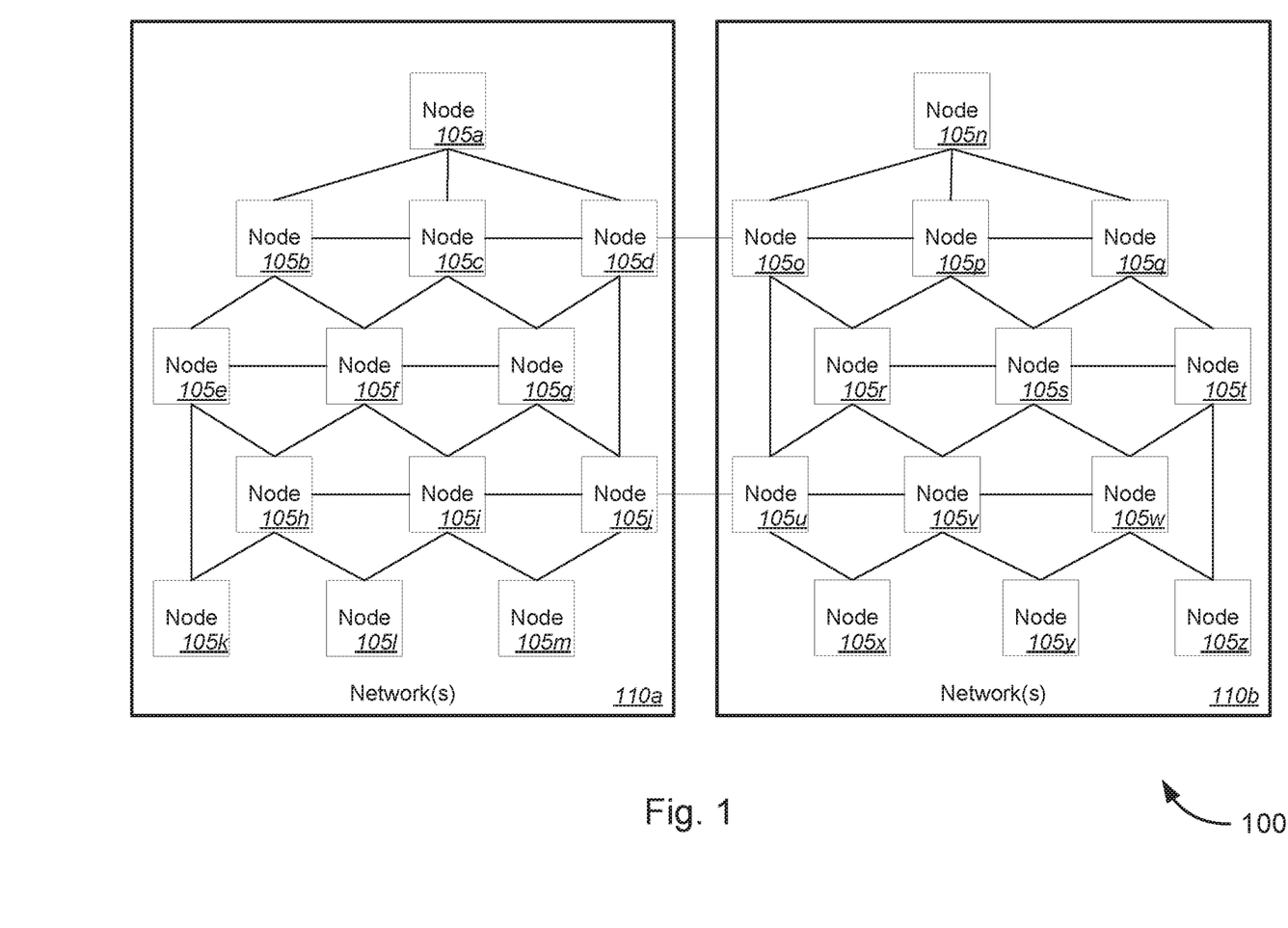
FIG. 1 is a schematic diagram illustrating a system for implementing a hierarchical distributed computing mesh, in accordance with various embodiments.

With reference to the figures, FIG. 1 is a schematic diagram illustrating a system for implementing a hierarchical distributed computing mesh, in accordance with various embodiments.

In the non-limiting example of FIG. 1, system 100 might comprise a plurality of computing nodes 105a-105z (collectively, "computing nodes 105" or the like). Computing nodes 105 may also be referred to as network node(s) 105 herein. Although computing nodes 105a-105z are shown in FIG. 1, system 100 is not limited to only those computing nodes shown. System 100 may have more or less computing node(s) 105 depending on the amount of processing power needed to complete a computational problem.

Computing nodes 105 may include, without limitation, at least one of one or more service provider computers, service provider devices, user computers, user devices, consumer grade equipment, and/or the like. A service provider computer, service provider device, user computer, user device, and/or consumer grade equipment can be a general purpose computer (including, merely by way of example, a desktop computer, a tablet computer, a laptop computer, a handheld computer, and/or the like), a computing device (e.g., a residential gateway, a business gateway, a virtual gateway, a game console, a mobile device, a personal digital assistant, a smart watch, and/or the like), cloud computing devices, a server(s), and/or a workstation computer(s), etc. Computing node(s) 105 may all be identical with similar processing power. Alternatively, computational node(s) 105 may be dissimilar hardware that are communicatively coupled together via a wired and/or wireless connection.

In various embodiments, system 100 may further comprise one or more network(s) 110a and 110b (collectively, "network(s) 110" or the like). Computing nodes 105 may be distributed in network(s) 110. Network(s) 110a and 110b may correspond to at least one of a service provider network, a local area network, and/or the like. Network(s) 110a and 110b may be the same network or may be different network(s). Computing nodes 105 might be communicatively coupled (via a wired and/or wireless connection) with each other within at least one of networks 110.

In further embodiments, users of network(s) 110 may be able to limit which computing nodes 105 may be used in distributed computing system 100. In a non-limiting example, a user may indicate that a particular computing node may not be used in a distributed computing system. Additionally and/or alternatively, a user of a network 110 may indicate that no computing nodes communicatively coupled within network 110 may be used within the distributed computing system 100. In a non-limiting example, a gateway within networks 110a and/or 110b may prevent the distributed computing system 100 from accessing computing nodes located with corresponding network 110a or 110b. Additionally and/or alternatively, users of network(s) 110 may be able designate particular computing nodes 105 that may be used in distributed computing system 100. A user of a network 110 may also indicate that one or more (or all) computing nodes within network 110 may be used within the distributed computing system 100.

In some embodiments, computing nodes 105 may act in conjunction with one another to create a distributed computing mesh to solve, complete, and/or process a computational problem (e.g., a problem that requires a particular amount of processing power). A computational problem may be divided into one or more computing tasks, and each computing task may be solved by a different computing node 105 and/or by a plurality of different computing nodes 105. A computational problem and/or computing task may be distributed across a virtually unlimited number of computing nodes 105 to solve, complete, and/or process the computational problem and/or computing task. This distribution of the computational problem and/or computing task may be implemented or performed in a hierarchical manner to allow almost infinite aggregation of computing nodes 105 to solve the computational problem and/or the computing task.

In various embodiments, the distributed computing system might comprise a plurality of control nodes, which may include at least one of one or more master control nodes, one or more intermediary control nodes, one or more additional intermediary control nodes, and/or the like. These control nodes may be computing node(s) 105 that have been assigned to be control nodes by other control nodes. Additionally and/or alternatively, a computing node may become a control node when the computing node receives a computational problem and/or computing task that requires more processing power than the particular computing node has. Control nodes are responsible for dividing computational problems and/or computing tasks among other control nodes and/or computing nodes. In other words, control nodes are responsible for managing other control nodes and/or computing nodes to complete or process a computing task.

In additional embodiments, system 100 may include one or more master control nodes (which may correspond to computing node 105a and/or computing node 105n). The master control node may be at least one of one or more service provider computers, one or more service provider devices, one or more user computers, one or more user devices, one or more consumer grade equipment, and/or the like. Each master control node may be responsible for processing a computational problem. The master control node (which may correspond to computing node 105a and/or 105n) may receive and/or generate a computational problem. For example, the master control node may receive a computational problem from one or more service provider computers, service provider devices, user computers, user devices, consumer grade equipment, and/or the like. Additionally and/or alternatively, a master control node may generate a computational problem (e.g., a user using the master control node may introduce a computational problem that requires distributed computing).

By way of example, the master control node may divide the received and/or generated computational problem into one or more computing tasks to be processed by one or more computing nodes 105. In some embodiments, the master control node may assign one or more additional computing nodes 105 to be one or more intermediary control nodes (represented by computing node(s) 105b-105j and computing node(s) 105o-105w).

In some cases, the master control node may send one or more intermediary control nodes a computing task that requires more processing power than the intermediary control nodes have. Thus, each intermediary control node, based on a determination that more processing power is required to complete the computing task, might divide the one or more received computing tasks into one or more portions of a computing task and send the one or more portions to additional computing nodes 105. Each intermediary control node might select different additional computing nodes 105. Alternatively, each intermediary control node may select some of the same additional computing nodes 105.

In some cases, each intermediary control node, may assign the one or more additional control nodes to be one or more additional intermediary control nodes to complete a portion of the computing task. Each additional intermediary control node may once again determine whether more processing power is needed to complete the portion of the computing task. Based on a determination that more processing power is needed, the additional intermediary control node(s) may divide the one or more portions of the computing task into one or more smaller portions of the computing task. These smaller portions may be sent to one or more additional computing nodes 105. Each additional intermediary control node might select different additional computing nodes 105. Alternatively, each additional intermediary control node may select some of the same additional computing nodes 105. This process may be repeated with the computing nodes 105 until enough processing power is obtained to solve the entire computational problem received by the master control node.

In various embodiments, the one or more control nodes may determine one or more computing node(s) 105 to receive a computing task and/or a portion of a computing task based on a variety of factors. For example, designating one or more computing nodes might include at least one of the following: (a) receiving user input from a user designating one or more computing nodes to use and selecting (with the one or more control nodes) one or more computing nodes in the network based at least in part on the user input; (b) selecting (with the one or more control nodes) a computing node in logical or physical proximity to the one or more control nodes; (c) selecting (with the one or more control nodes) a computing node that is appropriate to maintain necessary performance attributes (including, but not limited to, jitter, delay, bandwidth, etc.) to support processing of the one or more portions of the computational problem; (d) selecting (with the one or more control nodes) a computing node located within the same network as that of the one or more control nodes; (e) selecting (with the one or more control nodes) a computing node based on a determination that the computing node has enough processing power to complete a portion of a computing task; (f) selecting (with the one or more control nodes) a computing node based on information (e.g., information regarding processing power of the one or more additional computing nodes) received from the one or more computing nodes; and/or the like.

The user input may comprise a user designating one or more computing node(s). Additionally and/or alternatively, user input may include a user selecting a set of criteria the one or more control nodes may use to select a compute node. For example, the criteria may include causing the one or more control nodes to take into account whether the user is currently using a compute node, whether all compute nodes in a network should be used before transferring processing power outside the network, and/or the like. Herein, "logical proximity" might refer to proximity based on data transfer logic, which is not necessarily the same as "physical proximity," which might refer to geographical proximity. The one or more control nodes may query one or more computing node(s) 105 to determine their processing power and to determine the number of computing node(s) 105 necessary to complete a portion of the computational problem. Additionally and/or alternatively, the one or more control nodes may periodically receive information from one or more computing nodes indicating a processing power of the one or more computing node(s) 105. The information may include the processing power of only one computing node and/or the processing power may include the processing power of a computing node plus other computing nodes the computing node is communicatively coupled with in a network.

Once each portion of the computational problem is processed, each computing node 105 may send the processed portion of the computational problem back to the computing node that sent it the portion of the computational task. For example, each intermediary control node may receive one or more portions of a processed computing task from one or more additional computing nodes. The intermediary control nodes may then send the processed portions of the computing task back to one or more other control nodes and/or back to the master control node, for assembly or compilation. Additionally and/or alternatively, each intermediary control node may assemble or compile the received portions of the computing task before sending the computing task back to one or more other control nodes and/or back to the master control node. Once all portions of the computational problem are received at the master control node, the master control node may assemble or compile all the portions to form a completed, processed, and/or solved computational problem.

The hierarchical nature of this distributed computing framework allows a computational computing task to be distributed across a virtually unlimited number of computing nodes 105 or virtually unlimited number of layers of computing nodes 105 to solve and/or complete the computational problem and/or the computing task. Further, the hierarchical nature allows almost infinite aggregation of computing nodes 105 to solve the computational problem and/or the computing task. This framework does not require that computational power be centralized in server farms or data centers. Instead, computing node(s) 105 may be decentralized and spread throughout at least one of a local area network(s), a service provider network(s), a combination of a local area network and a service provider network, and/or the like.

These and other functions of the system 100 (and its components) are described in greater detail below with respect to FIGS. 2-6.

Figure 2:
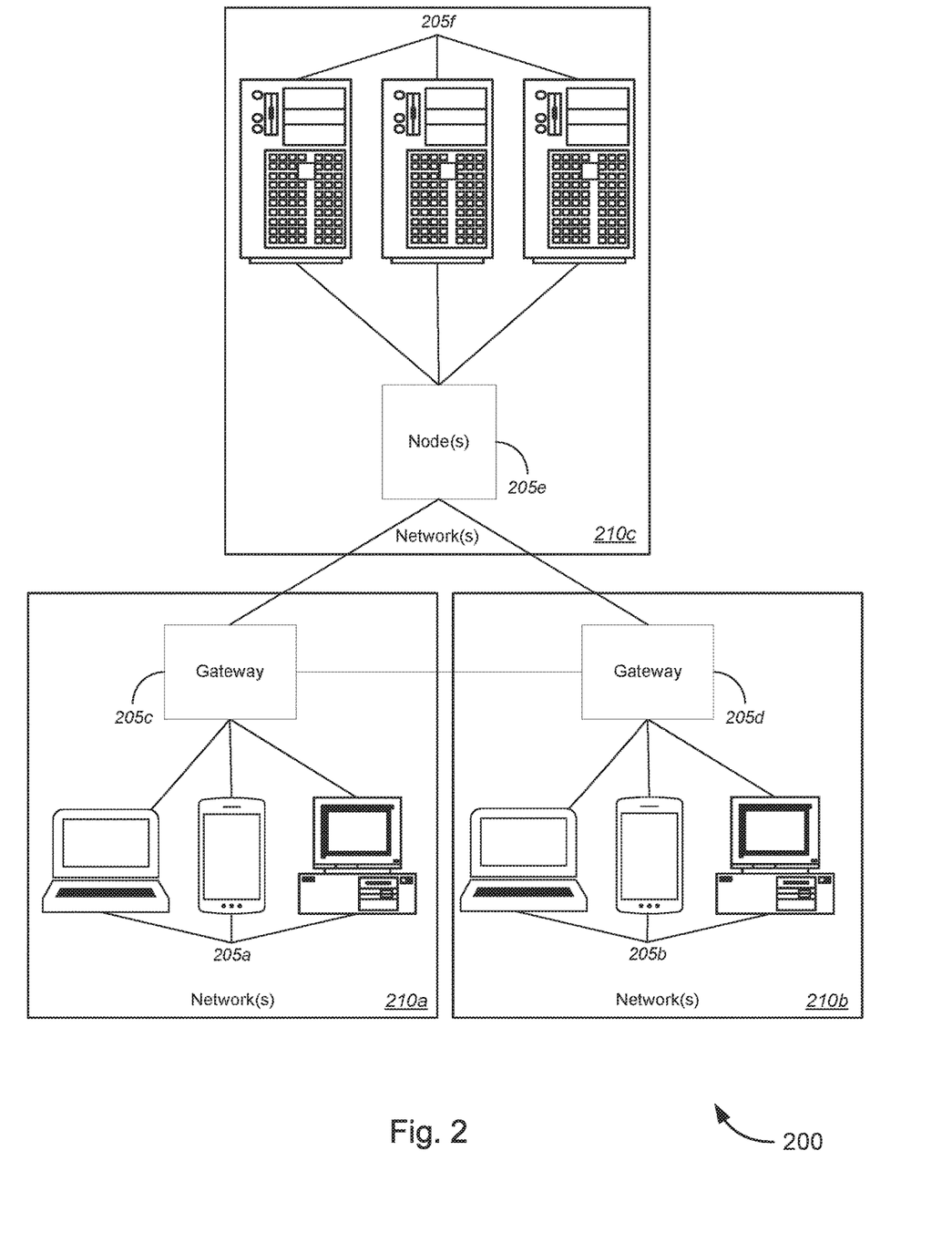
FIG. 2 is a schematic diagram illustrating another system for implementing a hierarchical distributed computing mesh, in accordance with various embodiments.

FIG. 2 is a schematic diagram illustrating another system for implementing a hierarchical distributed computing mesh, in accordance with various embodiments. FIG. 2 may be a specific implementation of the distributed computing system 100 of FIG. 1. However, FIG. 2 is merely an example and is not intended to be limited to the distributed computing system of FIG. 1.

In the non-limiting example of FIG. 2, system 200 might comprise a plurality of computing nodes 205*a*-205*f* (collectively, "computing nodes 205" or the like). Computing nodes 205 may also be referred to as "network node(s) 205." Although computing nodes 205*a*-205*f* are shown in FIG. 2, system 200 is not limited to only those computing nodes 205 shown. System 200 may have more or less computing node(s) 205 depending on the amount of processing power needed to complete a computational problem.

Computing nodes 205 may include at least one of one or more user computers (e.g., computing node(s) 205*a*-205*d*), one or more user devices (e.g., computing node(s) 205*a*-205*d*), one or more consumer grade equipment (e.g., computing node(s) 205*a*-205*d*), one or more service provider computers (e.g., computing node(s) 205*e* and 205*f*), one or more service provider devices (e.g., computing node(s) 205e and 205f), and/or the like. A user computer, a user device, a consumer grade equipment, a service provider computer, or a service provider device can be a general purpose computer (including, merely by way of example, a desktop computer 205a, a tablet computer, a laptop computer 205a, a handheld computer, and/or the like), a computing device (e.g., residential gateways 205c and 205d, business gateways 205c and 205d, virtual gateways 205c and 205d, video game consoles, mobile devices 205a and 205b, personal digital assistants, smart watches, and/or the like), cloud computing devices, servers 205f, and/or workstation computers, etc. Computing node(s) 205 may all be identical hardware with similar processing capabilities. Alternatively, computational node(s) 205 may be dissimilar hardware that are communicatively coupled together via a wired and/or wireless connection.

In various embodiments, system 200 may further comprise one or more network(s) 210a-210c (collectively, "network(s) 210" or the like). Computing nodes 205 may be distributed in network(s) 210. Network(s) 210a and 210b may correspond to a local area network. In some cases, network(s) 210a and 210b may correspond to the same local area network. Alternatively, network(s) 210a and 210b may be different local area networks associated with different customer premises such as homes, businesses, and/or the like. Network(s) 210c may be a service provider network(s). Computing nodes 205 might be communicatively coupled (via a wired and/or wireless connection) with each other within network(s) 210.

In some embodiments, computing nodes 205 located in network(s) 210 may act in conjunction with one another to solve and/or complete a computational problem and/or computing task. A computational problem and/or computing task may be distributed across a virtually unlimited number of computing nodes 205 or a virtually unlimited number of layers of computing nodes 205 to solve and/or complete the computational problem and/or computing task. This distribution of the computational problem and/or computing task may be implemented or performed in a hierarchical manner to allow almost infinite aggregation of computing nodes 205 to solve the computational problem and/or the computing task.

Although described generally above with respect to FIG. 1, below is a non-limiting example of how the distributed computing mesh may be implemented to complete, solve, and/or process a computational problem using a gateway device 205d. Gateway 205d may be at least one of a residential gateway, a business gateway, and/or a virtual gateway, or the like. Gateway 205d may be at least one of a master control node and/or assigned as an intermediary control node by a master control node and/or other intermediary control node, or the like. Gateway 205d may generate a computational problem and/or receive a computational problem and/or computing task from at least one of one or more user computers (e.g., computing node(s) 205a-205c), one or more user devices (e.g., computing node(s) 205a-205c), one or more consumer grade equipment (e.g., computing node(s) 205a-205c), one or more service provider computers (e.g., computing node(s) 205e and 205f), one or more service provider devices (e.g., computing node(s) 205e and 205f), and/or the like.

Next, gateway 205d may determine an amount of processing power necessary to complete the computational problem and/or computing task. Gateway 205d may then determine an amount of processing power available in a local area network 210b by receiving information associated with the one or more computing node(s) 205b. The information may include information regarding processing power of the one or more computing node(s) 205b. This information may be requested by gateway 205d when it receives a computational problem and/or computing task. Alternatively, this information may be periodically sent by computing nodes 205b to gateway 205d. Gateway 205d may further determine whether a user has selected one or more computing node(s) to be unavailable to perform a computational problem and/or computing task.

Gateway 205d may next determine, based at least in part on the information received from the one or more computing node(s) 205b, whether there is sufficient processing power to complete the computational problem and/or computing task within the local area network 210b. Based on a determination that the amount of processing power available in the local area network 210b is insufficient to complete the computing task, gateway 210d may designate at least one of one or more additional computing nodes 205 located in the local area network 210a and/or service provider network 210c to complete the computing task. These additional computing node(s) 205 may be assigned as one or more additional control nodes by gateway 210d depending on the size of the computational problem and/or computing task.

Gateway 205d may then divide the computational problem and/or computing task into one or more portions and may send the portions to at least one of computing node(s) 205a-205c, 205e, and/or 205f to be processed. Once each portion of the computational problem is processed, at least one of computing node(s) 205a-205c, 205e, and/or 205f may send the processed portion of the computational problem back to the gateway 205d. If the gateway 205d is an intermediary control node, the gateway 205d may assemble or compile the portions to form a processed computing task and send the processed computing task to one or more other intermediary control nodes and/or to the master control node. If the gateway 205d is the master control node, gateway 205d may assemble or compile the completed computing tasks into a completed, solved, and/or processed computational problem.

Although described above with respect to gateway 205d, computing nodes 205a-205c, 205e, and/or 205f may act in a similar manner as gateway 205d when distributing a computational problem and/or computing task among multiple computing nodes.

The hierarchical nature of this distributed computing framework allows a computational problem and/or computing task to be distributed across a virtually unlimited number of computing nodes 205 or a virtually unlimited number of layers of computing nodes 205 to solve and/or complete the computational problem and/or the computing task. Further, the hierarchical nature allows almost infinite aggregation of computing nodes 205 to solve the computational problem and/or the computing task. This framework does not require that computational power be centralized in server farms or data centers. Instead, computational node(s) 205 may be decentralized and spread throughout at least one of a local area network(s), a service provider network(s), a combination of a local area network and a service provider network, and/or the like.

These and other functions of the system 200 (and its components) are described in greater detail below with respect to FIGS. 3-6.

Figure 3:
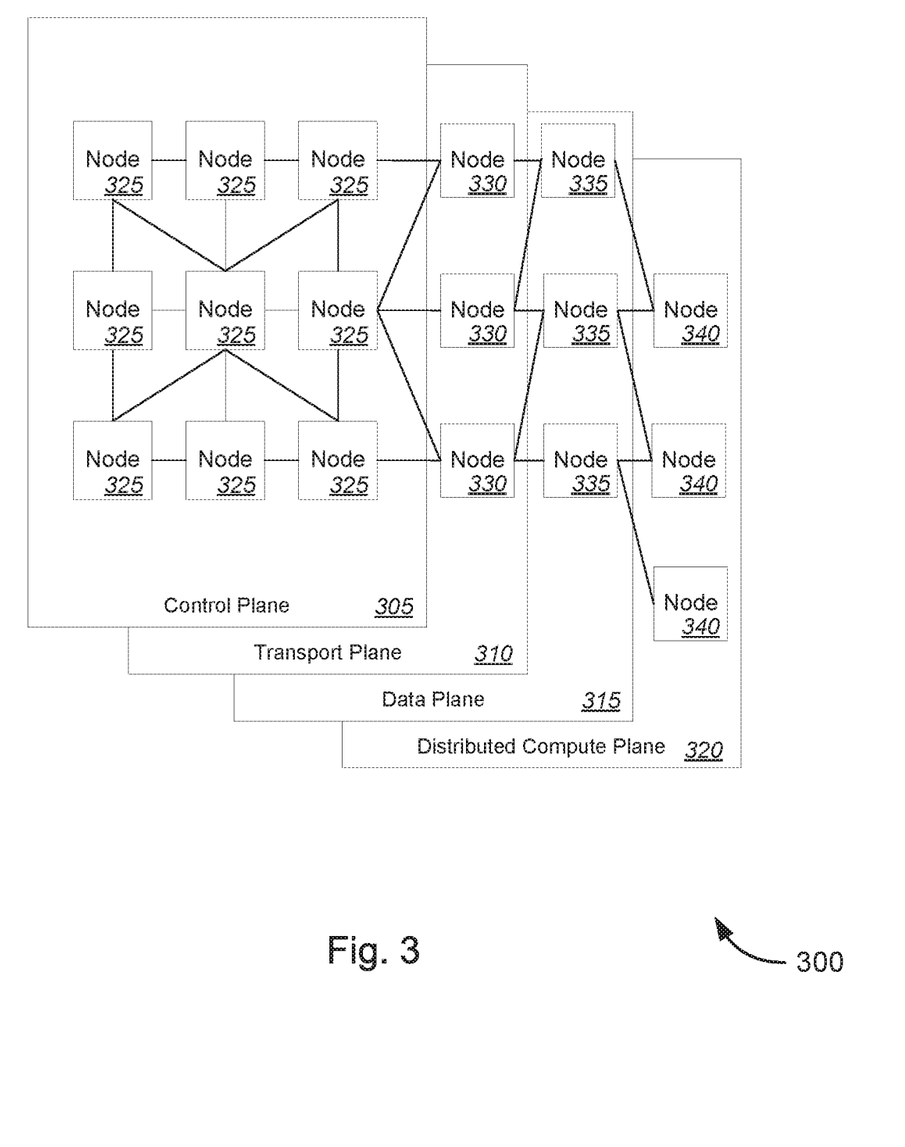
FIG. 3 is a functional block diagram illustrating a framework for implementing a hierarchical distributed computing mesh, in accordance with various embodiments.

FIG. 3 is a functional block diagram illustrating a framework 300 for implementing a hierarchical distributed computing mesh, in accordance with various embodiments. FIG. 3 defines a networking framework 300 to implement protocols in layers with control passed from one networking framework layer to the next. The networking framework for distributed computing might comprise, e.g., four different layers/planes: a control plane 305, a transport plane 310, a data plane 315, and/or a distributed compute plane 320. These layers may be incorporated within and/or correspond to one or more layers of the open systems interconnection ("OSI") framework, or the like. The various embodiments, however, are not so limited, and any combination of other layers or planes may be implemented consistent with the detailed description of the various embodiments herein.

The control plane 305 might comprise one or more control nodes 325, which may include one or more master control nodes, one or more intermediary control nodes, one or more additional intermediary control nodes, and/or the like. These control nodes 325 may be decentralized and located throughout one or more network(s). The control nodes 325 may be located in different networks (e.g., different local area networks, different service provider networks, a combination of a local area network and a service provider network, and/or the like). Each of these control nodes 325 may be in charge of dividing computational problems and/or dividing computing tasks between other control nodes 325 and/or computing node(s) 340 located in the distributed compute plane 320. An orchestrator may be used to coordinate the different control nodes 325 and computing nodes 340.

In various embodiments, some control nodes 325 of the control plane 305 may reside in a data center, a server farm, and/or the like of the service provider and/or content provider. Other control nodes may be located at a customer premises such as a home, a business, and/or the like. Each control node of the one or more control nodes 325 may control at least one of a particular geographical region of computing nodes 340, one or more computing nodes located in a particular network, and/or the like. By decentralizing the control nodes 325 in the control plane 305, the costs of distributed computing may be transferred from data centers, server farms, and/or the like to one or more customer premises. Further, decentralizing control nodes 325 may reduce the costs of utilizing data centers, server farms, and/or the like because the procurement, maintenance, and sustainment of the computing nodes are at least partially transferred to the consumer associated with the customer premises. Additionally, decentralizing control nodes minimizes the power, HVAC, and environmental costs because only portions of the control plane 305 may reside in the data center while other portions of the control plane 305 reside at a customer premises. And in some cases, the entire control plane may exist at the customer premises.

The transport plane 310 provides the functional and procedural means for transferring data between one or more control nodes 325, one or more transport nodes 330, one or more data nodes 335, one or more computing nodes 340, and/or the like. The transport plane 310 might comprise one or more transport nodes 330 that transport data between the one or more control nodes 325, the one or more transport nodes 330, the one or more data nodes 335, the one or more computing nodes 340, and/or the like.

The data plane 315 enables data transfer to and from the one or more control nodes 325, the one or more transport nodes 330, the one or more data nodes 335, the one or more computing nodes 340, and/or the like. In order to provide the computational capacity to complete a computing task, a "just-in-time" caching method may be used. The "just-in-time" caching method is a method of executing computer code that involves compilation (at run time) during execution of a program rather than prior to execution of the program. The "just-in-time" caching method may be based on a predictive algorithm that pre-fetches data that the one or more control nodes 325, the one or more transport nodes 330, the one or more data nodes 335, the one or more computing nodes 340, and/or the like might need to complete a computing task. The one or more data nodes 335 may store or cache pieces of data on the one or more control nodes 325, the one or more transport nodes 330, the one or more data nodes 335, the one or more computing nodes 340, and/or the like only for the duration that the one or more control nodes 325, the one or more transport nodes 330, the one or more data nodes 335, the one or more computing nodes 340 and/or the like might need the data to complete a computing task. By using the "just-in-time" caching method, the impact of latency across the computing mesh may be minimized while ensuring the security and integrity of the computing mesh created using the one or more control nodes 325, the one or more transport nodes 330, the one or more data nodes 335, the one or more computing nodes 340, and/or the like.

The distributed compute plane 320 might correspond to a layer in which different types of devices and resources from different networks are interconnected. The distributed compute plane 320 might comprise one or more computing nodes 340. Computing nodes 340 may include at least one of one or more service provider computers, one or more service provider devices, one or more user computers, one or more user devices, one or more consumer grade equipment, and/or the like. Computing node(s) 340 may all be identical hardware with similar processing power. Alternatively, computational node(s) 340 may be dissimilar hardware that are communicatively coupled together via a wired and/or wireless connection.

Computing nodes 340 may be responsible for processing one or more portions of a computational problem and/or computing task. Once the processing is completed, computing nodes 340 may transmit the processed portion back to one or more control nodes 325 via the transport plane 310.

This hierarchical framework allows a distributed computing mesh to be distributed across service provider network(s), local area network(s), and/or the like. The hierarchical framework shifts processing power from centralized data centers, server farms, and the like to customer premises.

Figure 4:
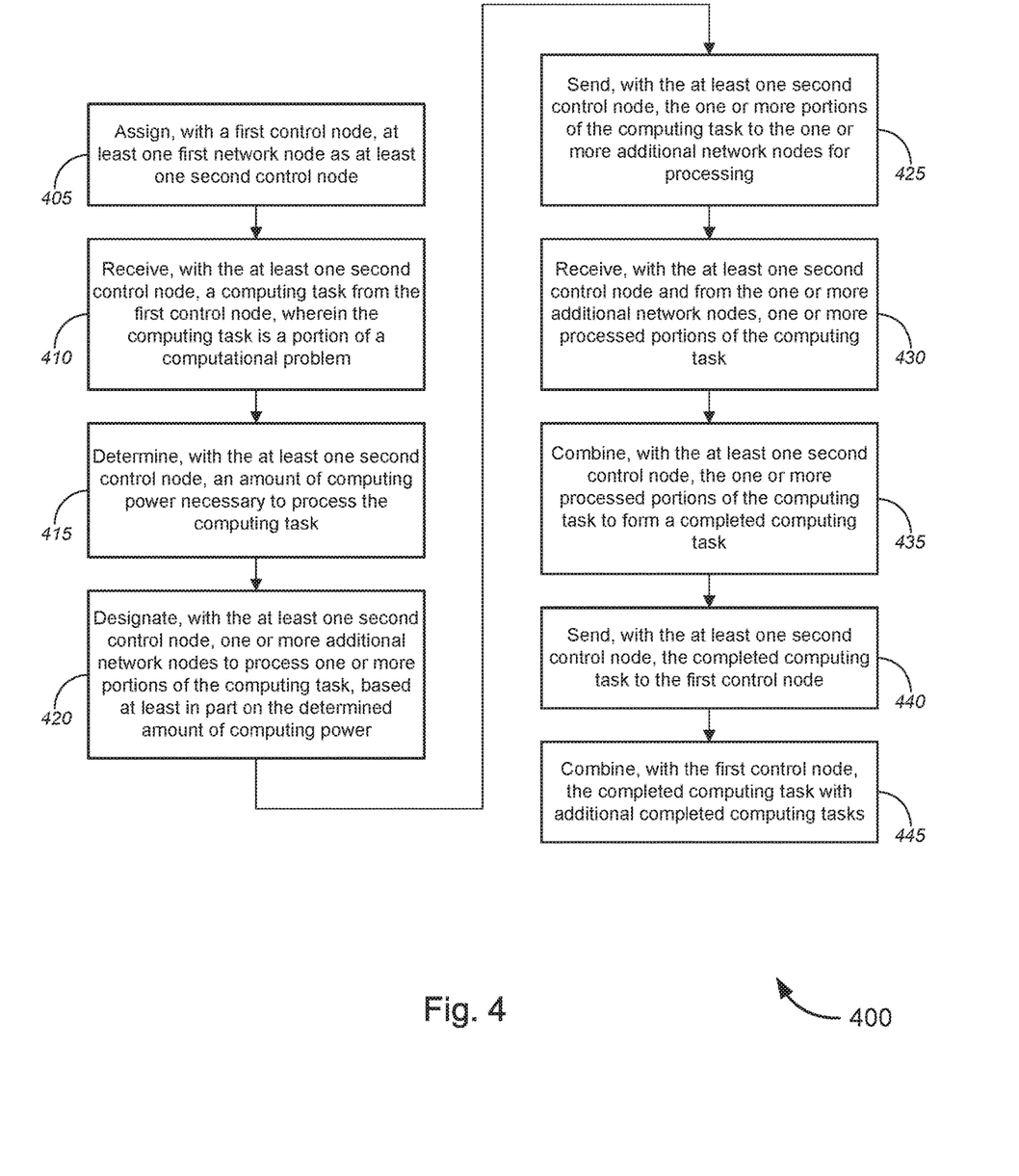
FIG. 4 is a flow diagram illustrating a method for implementing a hierarchical distributed computing mesh, in accordance with various embodiments.

FIG. 4 is a flow diagram illustrating a method 400 for implementing a hierarchical distributed computing mesh, in accordance with various embodiments.

While the techniques and procedures are depicted and/or described in a certain order for purposes of illustration, it should be appreciated that certain procedures may be reordered and/or omitted within the scope of various embodiments. Moreover, while the method 400 illustrated by FIG. 4 can be implemented by or with (and, in some cases, are described below with respect to) the systems 100, 200, and 300 of FIGS. 1, 2, and 3, respectively (or components thereof), such methods may also be implemented using any suitable hardware (or software) implementation. Similarly, while each of the systems 100, 200, and 300 of FIGS. 1, 2, and 3, respectively (or components thereof), can operate according to the method 400 illustrated by FIG. 4 (e.g., by executing instructions embodied on a computer readable medium), the systems 100, 200, and 300 of FIGS. 1, 2, and 3 can each also operate according to other modes of operation and/or perform other suitable procedures.

In the non-limiting embodiment of FIG. 4, method 400, at block 405, may comprise assigning, with a first control node, at least one first network node (also referred to as computing node) as at least one second control node. The first control node, the second control node, the network nodes, and/or the like may correspond to computing nodes 105 of FIG. 1, computing nodes 205 of FIG. 2, and/or control nodes 325, transport nodes 330, data nodes 335, and/or computing nodes 340 of FIG. 3, or the like.

The first control node, second control node, network nodes, and/or the like may include, without limitation, at least one of one or more service provider computers, one or more service provider devices, one or more user computers, one or more user devices, one or more consumer grade equipment, and/or the like. A service provider computer, a service provider device, a user computer, a user device, or a consumer grade equipment can be a general purpose computer (including, merely by way of example, a desktop computer, a tablet computer, a laptop computer, handheld computer, and/or the like), a computing device (e.g., a residential gateway, a business gateway, a virtual gateway, a game console, a mobile device, a personal digital assistant, a smart watch, and/or the like), cloud computing devices, a server(s), and/or a workstation computer(s), etc. A service provider computer, a service provider device, a user computer, a user device, or a customer device, and/or the like, can also have any of a variety of applications, including one or more applications configured to perform methods provided by various embodiments. The computing node(s) may all be identical hardware with similar processing power. Alternatively, the computational node(s) may be dissimilar hardware that are communicatively coupled together via a wired and/or wireless connection.

The first control node may be a master control node that receives the entire computational problem and divides the computational problem between one or more intermediary control nodes and/or one or more network nodes, or the like. Alternatively, the first control node may be an intermediary control node that receives a computing task and divides the computing task between one or more additional intermediary control nodes and/or one or more network nodes, or the like.

Method 400, at block 410, might further comprise receiving, with the at least one second control node, a computing task from the first control node. The computing task may be a portion of a computational problem. Method 400, at block 415, might further comprise determining, with the at least one second control node, an amount of computing power necessary to process the computing task. At block 420, method 400 might comprise designating, with the at least one second control node, one or more additional network nodes to process one or more portions of the computing task, based at least in part on the determined amount of computing power. The at least one second control node may then divide the computing task into one or more portions based at least in part on the determined processing power of each network node.

The at least one second control node may divide a portion of a computing task between network nodes and may designate network nodes to receive a portion of a computing task based on a variety of factors. For example, designating one or more network nodes might be based at least in part on at least one of the following: (a) receiving user input from a user designating one or more network nodes to use (i.e., a user initiating the computational problem) and selecting (with the second control node) a network node in the network based at least in part on the user input; (b) selecting (with the at least one second control node) a network node in logical or physical proximity to the at least one second control node, the master control node, intermediary control nodes, additional intermediary control nodes, and/or the like; (c) selecting (with the at least one second control node) a network node that is appropriate to maintain necessary performance attributes (including, but not limited to, jitter, delay, bandwidth, etc.) to support processing of the one or more portions of the computational problem; (d) selecting (with the at least one second control node) a network node located within the same network as that of the at least one second control node; (e) selecting (with the at least one second control node) a network node (or a number of network nodes) based on a determination that the network node (or the number of network nodes) has (have) enough processing power to complete a portion of a computing task; (f) selecting (with the at least one second control node) a network node (or a number of network nodes) based on information (e.g., information regarding processing power of the one or more additional network nodes) received from the one or more network nodes; and/or the like.

Based on the amount of processing power necessary to complete at least one portion of the computing task, the at least one second control node may assign the one or more additional network nodes to be one or more additional intermediary control nodes. Additionally and/or alternatively, a network node that receives a portion of a computing task may determine that more processing power is needed to perform a computing task and may then become an additional intermediary control node. The one or more additional intermediary control nodes may then perform a similar method (e.g., method 400) as that of the at least one second control node.

Further, in some embodiments, based on the amount of processing power necessary to complete at least one portion of a computing task, the at least one second control node may determine whether there is sufficient processing power within a network to complete a computing task. Based on a determination that the amount of processing power available in the network is insufficient to complete the computing task, the at least one second control node might designate additional network nodes located in a different network to complete the computing task.

In some embodiments, the method 400, at block 425, might comprise sending, with the at least one second control node, the one or more portions of the computing task to the one or more additional network nodes for processing. At block 430, method 400 might comprise receiving, with the at least one second control node and from the one or more additional network nodes, one or more processed portions of the computing task. Method 400, at block 435, might the comprise combining, with the at least one second control node, the one or more processed portions of the computing task to form a completed computing task.

Method 400, at block 440, might further include sending, with the at least one second control node, the completed computing task to the first control node. At block 445, method 400 might additionally comprise combining, with the first control node, the completed computing task with additional completed computing tasks. In the case where the first control node is the master control node, the completed computing tasks may be combined to form a completed computational problem. Alternatively, if the first control node is another intermediary control node, the completed computing tasks may be combined and sent on to another intermediary node and/or to the master control node for further processing. This process may be repeated until the computational problem is completed.

Exemplary System and Hardware Implementation

Figure 5:
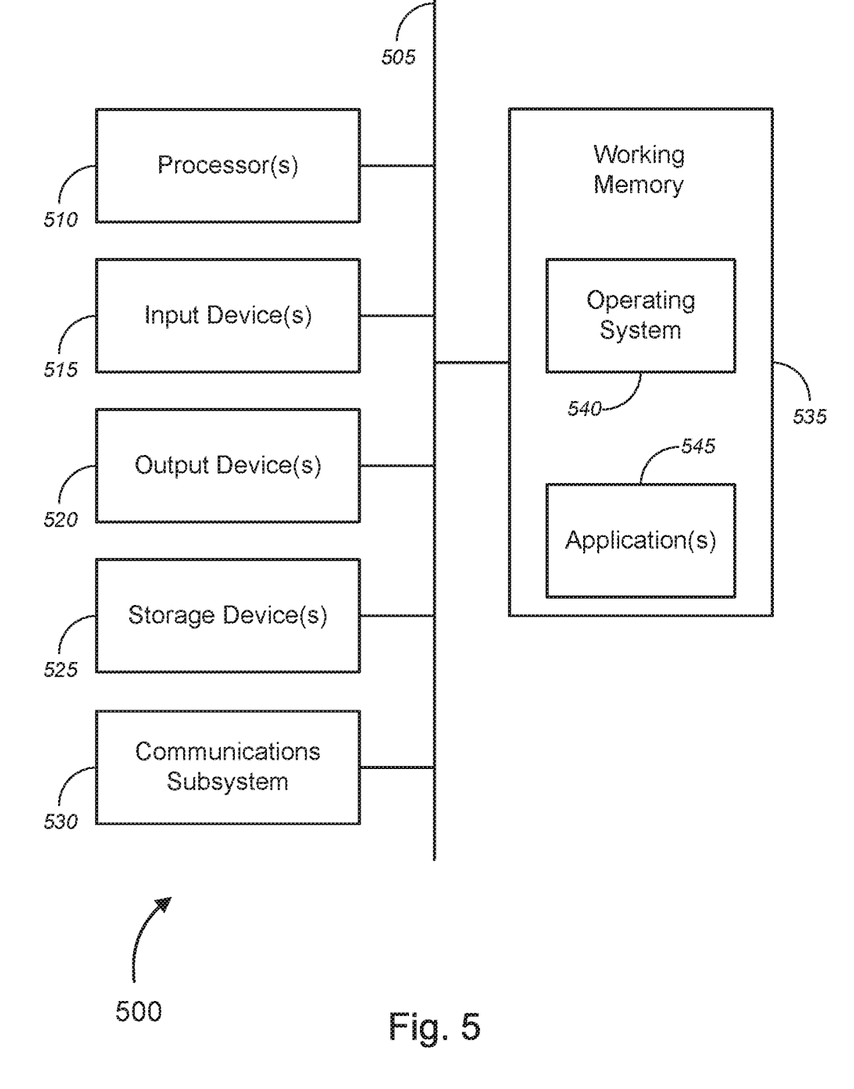
FIG. 5 is a block diagram illustrating an exemplary computer or system hardware architecture, in accordance with various embodiments.

FIG. 5 is a block diagram illustrating an exemplary computer or system hardware architecture, in accordance with various embodiments. FIG. 5 provides a schematic illustration of one embodiment of a computer system 500 of the service provider system hardware that can perform the methods provided by various other embodiments, as described herein, and/or can perform the functions of computer or hardware system (i.e., computing nodes (network nodes) 105, computing nodes (network nodes) 205, control nodes 325, transport nodes 330, data nodes 335, computing nodes 340, etc.), as described above. It should be noted that FIG. 5 is meant only to provide a generalized illustration of various components, of which one or more (or none) of each may be utilized as appropriate. FIG. 5, therefore, broadly illustrates how individual system elements may be implemented in a relatively separated or relatively more integrated manner.

The computer or hardware system 500—which might represent an embodiment of the computer or hardware system (i.e., computing nodes (network nodes) 105, computing nodes (network nodes) 205, control nodes 325, transport nodes 330, data nodes 335, computing nodes 340, etc.), described above with respect to FIGS. 1-4—is shown comprising hardware elements that can be electrically coupled via a bus 505 (or may otherwise be in communication, as appropriate). The hardware elements may include one or more processors 510, including, without limitation, one or more general-purpose processors and/or one or more special-purpose processors (such as microprocessors, digital signal processing chips, graphics acceleration processors, and/or the like); one or more input devices 515, which can include, without limitation, a mouse, a keyboard and/or the like; and one or more output devices 520, which can include, without limitation, a display device, a printer, and/or the like.

The computer or hardware system 500 may further include (and/or be in communication with) one or more storage devices 525, which can comprise, without limitation, local and/or network accessible storage, and/or can include, without limitation, a disk drive, a drive array, an optical storage device, solid-state storage device such as a random access memory ("RAM") and/or a read-only memory ("ROM"), which can be programmable, flash-updateable and/or the like. Such storage devices may be configured to implement any appropriate data stores, including, without limitation, various file systems, database structures, and/or the like.

The computer or hardware system 500 might also include a communications subsystem 530, which can include, without limitation, a modem, a network card (wireless or wired), an infra-red communication device, a wireless communication device and/or chipset (such as a Bluetooth™ device, an 802.11 device, a WiFi device, a WiMax device, a WWAN device, cellular communication facilities, etc.), and/or the like. The communications subsystem 530 may permit data to be exchanged with a network (such as the network described below, to name one example), with other computer or hardware systems, and/or with any other devices described herein. In many embodiments, the computer or hardware system 500 will further comprise a working memory 535, which can include a RAM or ROM device, as described above.

The computer or hardware system 500 also may comprise software elements, shown as being currently located within the working memory 535, including an operating system 540, device drivers, executable libraries, and/or other code, such as one or more application programs 545, which may comprise computer programs provided by various embodiments (including, without limitation, hypervisors, VMs, and the like), and/or may be designed to implement methods, and/or configure systems, provided by other embodiments, as described herein. Merely by way of example, one or more procedures described with respect to the method(s) discussed above might be implemented as code and/or instructions executable by a computer (and/or a processor within a computer); in an aspect, then, such code and/or instructions can be used to configure and/or adapt a general purpose computer (or other device) to perform one or more operations in accordance with the described methods.

A set of these instructions and/or code might be encoded and/or stored on a non-transitory computer readable storage medium, such as the storage device(s) 525 described above. In some cases, the storage medium might be incorporated within a computer system, such as the system 500. In other embodiments, the storage medium might be separate from a computer system (i.e., a removable medium, such as a compact disc, etc.), and/or provided in an installation package, such that the storage medium can be used to program, configure and/or adapt a general purpose computer with the instructions/code stored thereon. These instructions might take the form of executable code, which is executable by the computer or hardware system 500 and/or might take the form of source and/or installable code, which, upon compilation and/or installation on the computer or hardware system 500 (e.g., using any of a variety of generally available compilers, installation programs, compression/decompression utilities, etc.) then takes the form of executable code.

It will be apparent to those skilled in the art that substantial variations may be made in accordance with specific requirements. For example, customized hardware (such as programmable logic controllers, field-programmable gate arrays, application-specific integrated circuits, and/or the like) might also be used, and/or particular elements might be implemented in hardware, software (including portable software, such as applets, etc.), or both. Further, connection to other computing devices such as network input/output devices may be employed.

As mentioned above, in one aspect, some embodiments may employ a computer or hardware system (such as the computer or hardware system 500) to perform methods in accordance with various embodiments of the invention. According to a set of embodiments, some or all of the procedures of such methods are performed by the computer or hardware system 500 in response to processor 510 executing one or more sequences of one or more instructions (which might be incorporated into the operating system 540 and/or other code, such as an application program 545) contained in the working memory 535. Such instructions may be read into the working memory 535 from another computer readable medium, such as one or more of the storage device(s) 525. Merely by way of example, execution of the sequences of instructions contained in the working memory 535 might cause the processor(s) 510 to perform one or more procedures of the methods described herein.

The terms "machine readable medium" and "computer readable medium," as used herein, refer to any medium that participates in providing data that causes a machine to operate in a specific fashion. In an embodiment implemented using the computer or hardware system 500, various computer readable media might be involved in providing instructions/code to processor(s) 510 for execution and/or might be used to store and/or carry such instructions/code (e.g., as signals). In many implementations, a computer readable medium is a non-transitory, physical, and/or tangible storage medium. In some embodiments, a computer readable medium may take many forms, including, but not limited to, non-volatile media, volatile media, or the like. Non-volatile media includes, for example, optical and/or magnetic disks, such as the storage device(s) 525. Volatile media includes, without limitation, dynamic memory, such as the working memory 535. In some alternative embodiments, a computer readable medium may take the form of transmission media, which includes, without limitation, coaxial cables, copper wire and fiber optics, including the wires that comprise the bus 505, as well as the various components of the communication subsystem 530 (and/or the media by which the communications subsystem 530 provides communication with other devices). In an alternative set of embodiments, transmission media can also take the form of waves (including without limitation radio, acoustic and/or light waves, such as those generated during radio-wave and infra-red data communications).

Common forms of physical and/or tangible computer readable media include, for example, a floppy disk, a flexible disk, a hard disk, magnetic tape, or any other magnetic medium, a CD-ROM, any other optical medium, punch cards, paper tape, any other physical medium with patterns of holes, a RAM, a PROM, and EPROM, a FLASH-EPROM, any other memory chip or cartridge, a carrier wave as described hereinafter, or any other medium from which a computer can read instructions and/or code.

Various forms of computer readable media may be involved in carrying one or more sequences of one or more instructions to the processor(s) 510 for execution. Merely by way of example, the instructions may initially be carried on a magnetic disk and/or optical disc of a remote computer. A remote computer might load the instructions into its dynamic memory and send the instructions as signals over a transmission medium to be received and/or executed by the computer or hardware system 500. These signals, which might be in the form of electromagnetic signals, acoustic signals, optical signals, and/or the like, are all examples of carrier waves on which instructions can be encoded, in accordance with various embodiments of the invention.

The communications subsystem 530 (and/or components thereof) generally will receive the signals, and the bus 505 then might carry the signals (and/or the data, instructions, etc. carried by the signals) to the working memory 535, from which the processor(s) 505 retrieves and executes the instructions. The instructions received by the working memory 535 may optionally be stored on a storage device 525 either before or after execution by the processor(s) 510.

Figure 6:
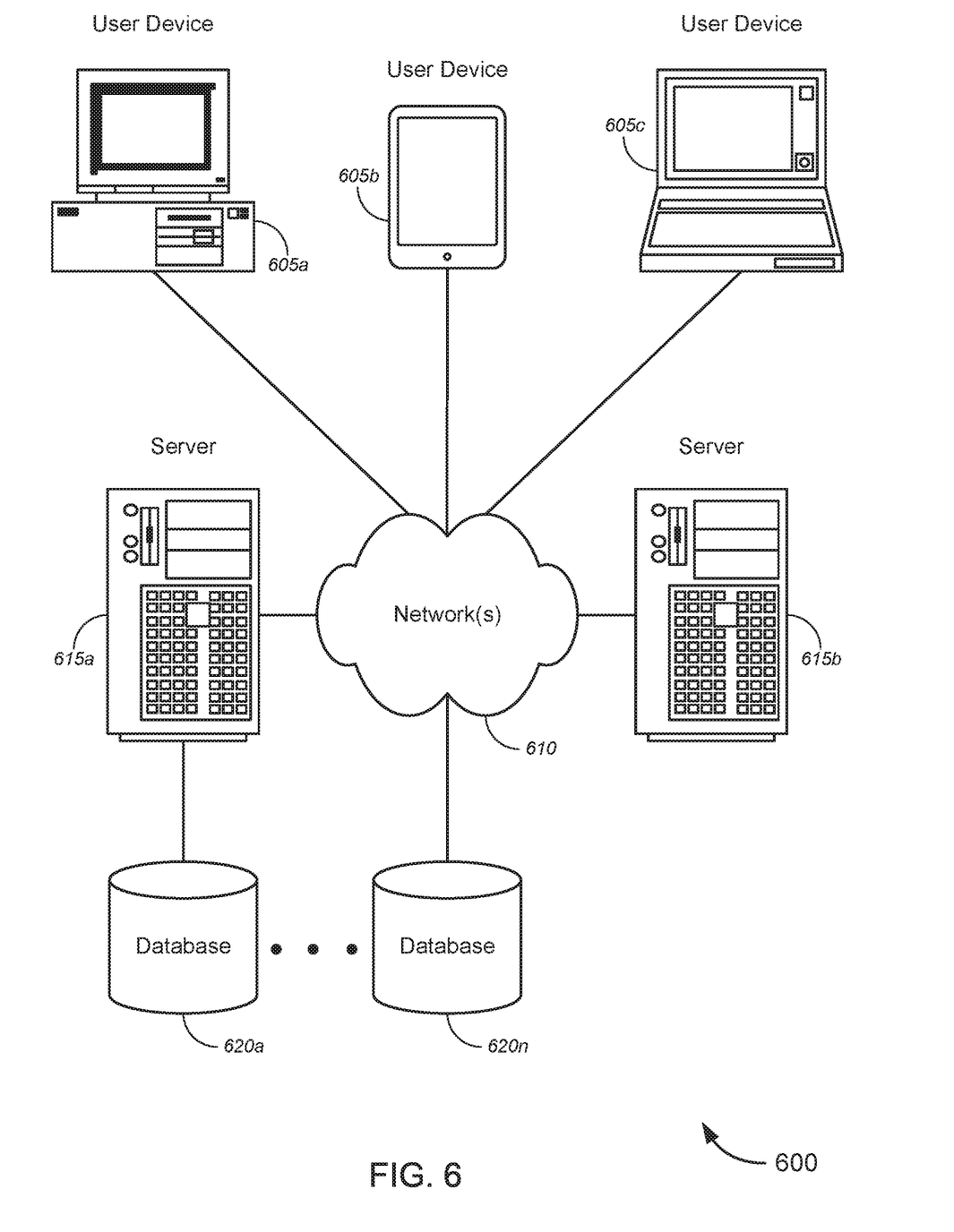
FIG. 6 is a block diagram illustrating a networked system of computers, computing systems, or system hardware architecture, which can be used in accordance with various embodiments.

As noted above, a set of embodiments comprises methods and systems for implementing a distributed computing mesh, and, more particularly, to methods, systems, and apparatuses for implementing a distributed computing mesh using a hierarchical framework to distribute workload across multiple computing nodes or across multiple layers of computing nodes. FIG. 6 illustrates a schematic diagram of a system 600 that can be used in accordance with one set of embodiments. The system 600 can include one or more user computers, user devices, or customer devices 605 (which may correspond to computing nodes (network nodes) 105, computing nodes (network nodes) 205, control nodes 325, data nodes 335, transport nodes 330, computing nodes 340, etc.). A user computer, user device, or customer device 605 can be a general purpose personal computer (including, merely by way of example, desktop computers, tablet computers, laptop computers, handheld computers, and the like, running any appropriate operating system, several of which are available from vendors such as Apple, Microsoft Corp., and the like), cloud computing devices, a server(s), and/or a workstation computer(s) running any of a variety of commercially-available UNIX™ or UNIX-like operating systems. A user computer, user device, or customer device 605 can also have any of a variety of applications, including one or more applications configured to perform methods provided by various embodiments (as described above, for example), as well as one or more office applications, database client and/or server applications, and/or web browser applications. Alternatively, a user computer, user device, or customer device 605 can be any other electronic device, such as a thin-client computer, Internet-enabled mobile telephone, and/or personal digital assistant, capable of communicating via a network (e.g., the network(s) 610 described below) and/or of displaying and navigating web pages or other types of electronic documents. Although the exemplary system 600 is shown with two user computers, user devices, or customer devices 605, any number of user computers, user devices, or customer devices can be supported.

Certain embodiments operate in a networked environment, which can include a network(s) 610 (which may correspond to network(s) 110a, network(s) 110b, network(s) 210a, network(s) 210b, network(s) 210c, etc.). The network(s) 610 can be any type of network familiar to those skilled in the art that can support data communications using any of a variety of commercially-available (and/or free or proprietary) protocols, including, without limitation, TCP/IP, SNA™, IPX™, AppleTalk™, and the like. Merely by way of example, the network(s) 610 (similar to network(s) 110 FIG. 1 or network(s) 210 of FIG. 2, or the like) can each include a local area network ("LAN"), including, without limitation, a fiber network, an Ethernet network, a Token-Ring™ network and/or the like; a wide-area network ("WAN"); a wireless wide area network ("WWAN"); a virtual network, such as a virtual private network ("VPN"); the Internet; an intranet; an extranet; a public switched telephone network ("PSTN"); an infra-red network; a wireless network, including, without limitation, a network operating under any of the IEEE 802.11 suite of protocols, the Bluetooth™ protocol known in the art, and/or any other wireless protocol; and/or any combination of these and/or other networks. In a particular embodiment, the network might include an access network of the service provider (e.g., an Internet service provider ("ISP")). In another embodiment, the network might include a core network of the service provider, and/or the Internet.

Embodiments can also include one or more server computers 615 (which may correspond to computing nodes (network nodes) 105, computing nodes (network nodes) 205, control nodes 325, transport nodes 330, data nodes 335, computing nodes 340, etc.). Each of the server computers 615 may be configured with an operating system, including, without limitation, any of those discussed above, as well as any commercially (or freely) available server operating systems. Each of the servers 615 may also be running one or more applications, which can be configured to provide services to one or more clients 605 and/or other servers 615.

Merely by way of example, one of the servers 615 might be a data server, a web server, a cloud computing device(s), or the like, as described above. The data server might include (or be in communication with) a web server, which can be used, merely by way of example, to process requests for web pages or other electronic documents from user computers 605. The web server can also run a variety of server applications, including HTTP servers, FTP servers, CGI servers, database servers, Java servers, and the like. In some embodiments of the invention, the web server may be configured to serve web pages that can be operated within a web browser on one or more of the user computers 605 to perform methods of the invention.

The server computers 615, in some embodiments, might include one or more application servers, which can be configured with one or more applications accessible by a client running on one or more of the client computers 605 and/or other servers 615. Merely by way of example, the server(s) 615 can be one or more general purpose computers capable of executing programs or scripts in response to the user computers 605 and/or other servers 615, including, without limitation, web applications (which might, in some cases, be configured to perform methods provided by various embodiments). Merely by way of example, a web application can be implemented as one or more scripts or programs written in any suitable programming language, such as Java™, C, C#™ or C++, and/or any scripting language, such as Perl, Python, or TCL, as well as combinations of any programming and/or scripting languages. The application server(s) can also include database servers, including, without limitation, those commercially available from Oracle™, Microsoft™, Sybase™, IBM™, and the like, which can process requests from clients (including, depending on the configuration, dedicated database clients, API clients, web browsers, etc.) running on a user computer, user device, or customer device 605 and/or another server 615. In some embodiments, an application server can perform one or more of the processes for implementing a distributed computing mesh, and, more particularly, to methods, systems, and apparatuses for implementing a distributed computing mesh using a hierarchical framework to distribute workload across multiple computing nodes or across multiple layers of computing nodes, as described in detail above. Data provided by an application server may be formatted as one or more web pages (comprising HTML, JavaScript, etc., for example) and/or may be forwarded to a user computer 605 via a web server (as described above, for example). Similarly, a web server might receive web page requests and/or input data from a user computer 605 and/or forward the web page requests and/or input data to an application server. In some cases, a web server may be integrated with an application server.

In accordance with further embodiments, one or more servers 615 can function as a file server and/or can include one or more of the files (e.g., application code, data files, etc.) necessary to implement various disclosed methods, incorporated by an application running on a user computer 605 and/or another server 615. Alternatively, as those skilled in the art will appreciate, a file server can include all necessary files, allowing such an application to be invoked remotely by a user computer, user device, or customer device 605 and/or server 615.

It should be noted that the functions described with respect to various servers herein (e.g., application server, database server, web server, file server, etc.) can be performed by a single server and/or a plurality of specialized servers, depending on implementation-specific needs and parameters.

In certain embodiments, the system can include one or more databases 620a-620n (collectively, "databases 620" and which may correspond to computing nodes (network nodes) 105, computing nodes (network nodes) 205, control nodes 325, transport nodes 330, data nodes 335, computing nodes 340, etc.). The location of each of the databases 620 is discretionary: merely by way of example, a database 620a might reside on a storage medium local to (and/or resident in) a server 615a (and/or a user computer, user device, or customer device 605). Alternatively, a database 620n can be remote from any or all of the computers 605, 615, so long as it can be in communication (e.g., via the network 610) with one or more of these. In a particular set of embodiments, a database 620 can reside in a storage-area network ("SAN") familiar to those skilled in the art. (Likewise, any necessary files for performing the functions attributed to the computers 605, 615 can be stored locally on the respective computer and/or remotely, as appropriate.) In one set of embodiments, the database 620 can be a relational database, such as an Oracle database, that is adapted to store, update, and retrieve data in response to SQL-formatted commands. The database might be controlled and/or maintained by a database server, as described above, for example.

According to some embodiments, system 600 might be used to implement a distributed computing mesh. Computing nodes may include one or more user computers, user devices, or customer devices 605, one or more server computer(s) 615, and/or one or more database(s) 620. The computing nodes may be communicatively coupled together within network(s) 610. A computational problem/computing task may be divided and distributed among the computing nodes which may include one or more user computers, user devices, or customer devices 605, one or more server computer(s) 615, and/or one or more database(s) 620. The computational problem may be processed in a hierarchical manner similar to the systems/methods described in FIGS. 1-4.

The hierarchical nature of this distributed computing framework allows a computational computing task to be distributed across a virtually unlimited number (or a virtually unlimited number of layers) of one or more user computers, user devices, or customer devices 605, one or more server computer(s) 615, and/or one or more database(s) 620 to solve and/or complete the computational problem and/or the computing task. Further, the hierarchical nature allows almost infinite aggregation of one or more user computers, user devices, or customer devices 605, one or more server computer(s) 615, and/or one or more database(s) 620 to solve the computational problem and/or the computing task. This framework does not require that computational power be centralized in server farms or data centers. Instead, computing node(s) 605 may be decentralized and spread throughout at least one of a local area network(s), a service provider network(s), a combination of a local area network and a service provider network, and/or the like.

These and other functions of the system 600 (and its components) are described in greater detail above with respect to FIGS. 1-4.

While certain features and aspects have been described with respect to exemplary embodiments, one skilled in the art will recognize that numerous modifications are possible. For example, the methods and processes described herein may be implemented using hardware components, software components, and/or any combination thereof. Further, while various methods and processes described herein may be described with respect to particular structural and/or functional components for ease of description, methods provided by various embodiments are not limited to any particular structural and/or functional architecture but instead can be implemented on any suitable hardware, firmware and/or software configuration. Similarly, while certain functionality is ascribed to certain system components, unless the context dictates otherwise, this functionality can be distributed among various other system components in accordance with the several embodiments.

Moreover, while the procedures of the methods and processes described herein are described in a particular order for ease of description, unless the context dictates otherwise, various procedures may be reordered, added, and/or omitted in accordance with various embodiments. Moreover, the procedures described with respect to one method or process may be incorporated within other described methods or processes; likewise, system components described according to a particular structural architecture and/or with respect to one system may be organized in alternative structural architectures and/or incorporated within other described systems. Hence, while various embodiments are described with—or without—certain features for ease of description and to illustrate exemplary aspects of those embodiments, the various components and/or features described herein with respect to a particular embodiment can be substituted, added and/or subtracted from among other described embodiments, unless the context dictates otherwise. Consequently, although several exemplary embodiments are described above, it will be appreciated that the invention is intended to cover all modifications and equivalents within the scope of the following claims.

What is claimed is:

1. A method, comprising:
   assigning, with a first control node, at least two first network nodes as at least two second control nodes;
   receiving, with the at least two second control nodes, a computing task from the first control node, wherein the computing task is a portion of a computational problem;
   determining, with each of the at least two second control nodes, an amount of computing power necessary to process the computing task;
   designating, with each of the at least two second control nodes, one or more additional network nodes to process one or more portions of the computing task, based at least in part on the determined amount of computing power;
   sending, with each of the at least two second control nodes, the one or more portions of the computing task to the one or more additional network nodes for processing;
   receiving, with each of the at least two second control nodes and from the one or more additional network nodes, one or more processed portions of the computing task;
   determining, with the at least one second control node, an amount of processing power available in a local area network;
   designating, with the at least one second control node, at least one of one or more additional control nodes or one or more supplemental network nodes located in a service provider network to complete the computing task based on a determination that the amount of processing power available in the local area network is insufficient to complete the computing task,
   the service provider network being separate from the local area network, and
   the one or more additional control nodes or one or more supplemental network nodes are not included in the local area network;
   combining, with each of the at least two second control nodes, the one or more portions of the computing task to form a completed computing task; and
   sending, with each of the at least two second control nodes, the completed computing task to the first control node; and
   combining, with the first control node, the completed computing tasks that are received from the at least two second control nodes, to form a completed computational problem.

2. The method of claim 1, further comprising:
   combining, with the at least one second control node, the one or more processed portions of the computing task to form a completed computing task; and
   sending, with the at least one second control node, the completed computing task to the first control node.

3. The method of claim 1, wherein the first control node is a master control node.

4. The method of claim 1, wherein the first control node is at least one of a master control node or another intermediary control node.

5. The method of claim 1, further comprising:
   assigning, with the at least one second control node, the one or more additional network nodes to be one or more additional intermediary control nodes.

6. The method of claim 1, wherein at least one of the first control node or the at least one second control node is one of a residential gateway, a business gateway, or a virtual gateway.

7. The method of claim 1, wherein the one or more additional network nodes are at least one of residential gateways, business gateways, or virtual gateways.

8. The method of claim 1, wherein the one or more additional network nodes are consumer grade equipment, wherein the consumer grade equipment are each at least one of a desktop computer, a tablet computer, a laptop computer, a handheld computer, an Internet-enabled mobile telephone, a personal digital assistant, a smart watch, or a video game console.

9. The method of claim 8, wherein the one or more additional network nodes are two different types of consumer grade equipment.

10. The method of claim 1, wherein the at least one second control node designates the one or more additional network nodes to process one or more portions of the computing task based at least in part on proximity of the one or more additional network nodes to the at least one second control node.

11. The method of claim 10, wherein the proximity of the one or more additional network nodes is determined based at least in part on at least one of logical proximity of the one or more additional network nodes to the at least one second control node or physical proximity of the one or more additional network nodes to the at least one second control node.

12. The method of claim 1, further comprising:
   receiving, with the at least one second control node and from the one or more additional network nodes, information associated with the one or more additional network nodes, wherein the information includes information regarding processing power of the one or more additional network nodes; and
   determining, with the at least one second control node and based on the information received from the one or more additional network nodes, a number of the one or more additional network nodes necessary to complete the computing task.

* * * * *